US010102851B1

(12) United States Patent
Kiss et al.

(10) Patent No.: US 10,102,851 B1
(45) Date of Patent: Oct. 16, 2018

(54) INCREMENTAL UTTERANCE PROCESSING AND SEMANTIC STABILITY DETERMINATION

(71) Applicant: Amazon Technologies, Inc., Reno, NV (US)

(72) Inventors: Imre Attila Kiss, Arlington, MA (US); Hugh Evan Secker-Walker, Newburyport, MA (US)

(73) Assignee: Amazon Technologies, Inc., Seattle, WA (US)

( * ) Notice: Subject to any disclaimer, the term of this patent is extended or adjusted under 35 U.S.C. 154(b) by 132 days.

(21) Appl. No.: 14/012,262

(22) Filed: Aug. 28, 2013

(51) Int. Cl.
G10L 15/22 (2006.01)
G10L 15/18 (2013.01)

(52) U.S. Cl.
CPC .......... G10L 15/22 (2013.01); G10L 15/1822 (2013.01)

(58) Field of Classification Search
CPC ............................ G10L 15/22; G10L 15/1822
USPC ........................................................ 704/254
See application file for complete search history.

(56) References Cited

U.S. PATENT DOCUMENTS

| | | | | |
|---|---|---|---|---|
| 6,598,017 B1 * | 7/2003 | Yamamoto | .......... | G10L 15/1815 704/235 |
| 6,631,346 B1 * | 10/2003 | Karaorman | ......... | G10L 15/1822 704/275 |
| 7,933,773 B1 * | 4/2011 | Gorin et al. | ................... | 704/240 |
| 8,155,962 B2 * | 4/2012 | Kennewick et al. | ......... | 704/257 |
| 8,244,522 B2 * | 8/2012 | Nakano et al. | ................... | 704/9 |
| 8,265,939 B2 * | 9/2012 | Kanevsky | ........... | G10L 15/1815 704/251 |
| 8,515,750 B1 * | 8/2013 | Lei | .......................... | G10L 15/26 704/235 |
| 9,361,883 B2 * | 6/2016 | Paek | ....................... | G10L 15/22 704/251 |
| 2003/0130976 A1 * | 7/2003 | Au | ......................... | G06F 17/27 706/55 |
| 2003/0216905 A1 * | 11/2003 | Chelba | ................. | G06F 17/271 704/9 |
| 2003/0233230 A1 * | 12/2003 | Ammicht | ............. | G10L 15/183 704/235 |

(Continued)

OTHER PUBLICATIONS

Alleva, F., Huang, X., & Hwang, M. Y. (Apr. 1993). An improved search algorithm using incremental knowledge for continuous speech recognition. In Acoustics, Speech, and Signal Processing, 1993. ICASSP-93., 1993 IEEE International Conference on (vol. 2, pp. 307-310). IEEE.*

(Continued)

*Primary Examiner* — Richemond Dorvil
*Assistant Examiner* — Bryan S Blankenagel
(74) *Attorney, Agent, or Firm* — Knobbe, Martens, Olson & Bear, LLP

(57) ABSTRACT

Incremental speech recognition results are generated and used to determine a user's intent from an utterance. Utterance audio data may be partitioned into multiple portions, and incremental speech recognition results may be generated from one or more of the portions. A natural language understanding module or some other language processing module can generate semantic representations of the utterance from the incremental speech recognition results. Stability of the determined intent may be determined over the course of time, and actions may be taken in response to meeting certain stability thresholds.

26 Claims, 5 Drawing Sheets

(56) References Cited

U.S. PATENT DOCUMENTS

| | | | |
|---|---|---|---|
| 2005/0071170 A1* | 3/2005 | Comerford | G10L 15/22 704/275 |
| 2005/0075876 A1* | 4/2005 | Tsuruta | G10L 15/187 704/251 |
| 2005/0149326 A1* | 7/2005 | Hogengout | G10L 15/08 704/242 |
| 2005/0256715 A1* | 11/2005 | Okimoto | G06F 17/2715 704/257 |
| 2006/0074659 A1* | 4/2006 | Adams | G10L 15/26 704/251 |
| 2006/0100862 A1* | 5/2006 | Deng | G10L 15/02 704/207 |
| 2006/0195321 A1* | 8/2006 | Deligne | G10L 15/18 704/257 |
| 2007/0055529 A1* | 3/2007 | Kanevsky | G10L 15/1815 704/275 |
| 2008/0133245 A1* | 6/2008 | Proulx et al. | 704/277 |
| 2008/0154594 A1* | 6/2008 | Itoh | G10L 15/04 704/235 |
| 2008/0177536 A1* | 7/2008 | Sherwani | G06F 17/30746 704/235 |
| 2008/0177543 A1* | 7/2008 | Nagano | G10L 15/04 704/253 |
| 2008/0189106 A1* | 8/2008 | Low | G01C 21/3608 704/231 |
| 2009/0099841 A1* | 4/2009 | Chen | G06K 9/72 704/9 |
| 2009/0144609 A1* | 6/2009 | Liang | G06F 17/21 715/230 |
| 2009/0198642 A1* | 8/2009 | Akkiraju | G06N 5/02 706/54 |
| 2009/0248665 A1* | 10/2009 | Garg | G06F 17/30654 |
| 2010/0042576 A1* | 2/2010 | Roettger | G06F 17/278 706/55 |
| 2010/0250243 A1* | 9/2010 | Schalk | G10L 15/30 704/201 |
| 2012/0059657 A1* | 3/2012 | Willey | G10L 15/02 704/256.1 |
| 2012/0102033 A1* | 4/2012 | Sarshar | G06F 17/30784 707/737 |
| 2012/0116765 A1* | 5/2012 | Hanazawa | G10L 15/08 704/251 |
| 2012/0215539 A1* | 8/2012 | Juneja | G10L 15/30 704/254 |
| 2012/0215559 A1* | 8/2012 | Flanagan | G06Q 10/10 705/3 |
| 2013/0110492 A1* | 5/2013 | McGraw | G10L 15/08 704/2 |
| 2014/0039895 A1* | 2/2014 | Aravamudan | G10L 15/187 704/257 |
| 2014/0156268 A1* | 6/2014 | Arizmendi | G10L 15/00 704/231 |

OTHER PUBLICATIONS

Kenji Sagae, Gwen Christian, David DeVault, and David Traum. Towards natural language understanding of partial speech recognition results in dialogue systems. In Proceedings of NAACL-HLT, pp. 53-56, Boulder, USA, May 2009.*

McGraw, Ian, and Alexander Gruenstein. "Estimating word-stability during incremental speech recognition." Thirteenth Annual Conference of the International Speech Communication Association. 2012.*

Baumann, Timo, Michaela Atterer, and David Schlangen. "Assessing and improving the performance of speech recognition for incremental systems." Proceedings of Human Language Technologies: The 2009 Annual Conference of the North American Chapter of the Association for Computational Linguistics. Association for Computational Linguistics, 2009.*

Baumann, Timo, Okko Buβ, and David Schlangen. "Evaluation and optimisation of incremental processors." Dialogue & Discourse 2.1 (2011): 113-141.*

* cited by examiner

INCREMENTAL UTTERANCE PROCESSING AND SEMANTIC STABILITY DETERMINATION

BACKGROUND

Natural language processing systems include various modules and components for receiving textual input from a user and determining what the user meant. In some implementations, a natural language processing system includes an automatic speech recognition ("ASR") module that receives audio input of a user utterance and generates one or more likely transcriptions of the utterance. Natural language processing systems may also include a natural language understanding ("NLU") module that receives textual input, such as a transcription of a user utterance, and determines the meaning of the text in a way that can be acted upon, such as by a computer application. For example, a user of a mobile phone may issue a spoken command to initiate a phone call. Audio of the spoken command can be transcribed by the ASR module, and the NLU module can determine the user's intent (e.g., that the user wants to initiate the phone call feature) from the transcription and generate a command to initiate the phone call.

An NLU module can identify particular words (e.g., named entities) in the transcription that are of particular importance in determining the user's intent. Based on those named entities, the NLU module can identify the user's intent and generate an output that may be used by an application to respond or otherwise perform an action regarding the user's intent. In a typical implementation, application software utilizes information about the user's intent, as determined by the NLU module, to perform actions, such as user-requested operations like playing music, performing searches, launching programs, etc.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
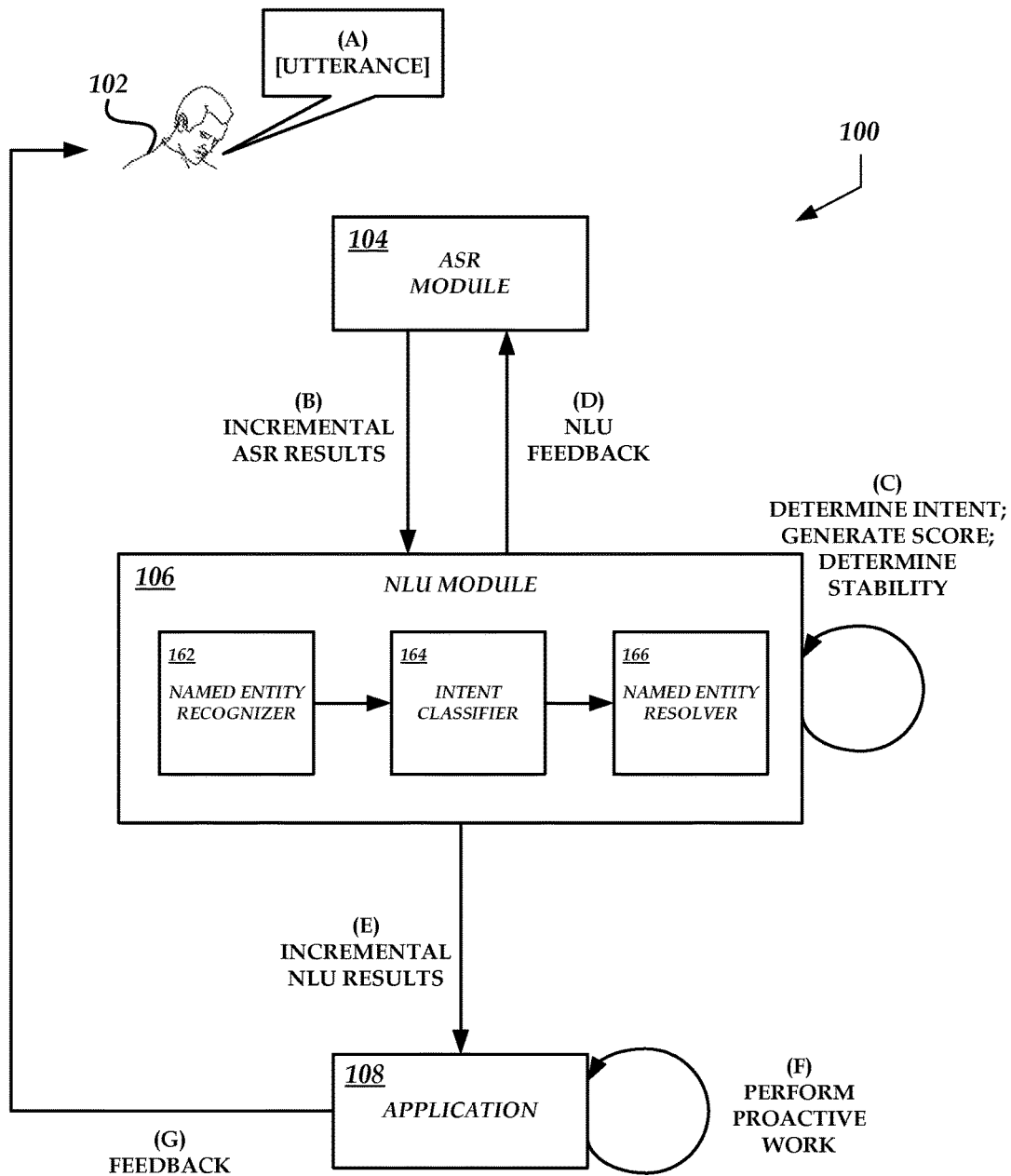
FIG. 1 is a block diagram of illustrative data flows between a user and modules of a spoken language processing system, including the generation and use of incremental processing results.

Natural language processing ("NLP") systems can receive textual input and determine the likely meaning of the input. Some NLP systems perform speech recognition and generate spoken language processing results, including the likely meaning of user utterances, for use by applications that respond to user utterances. An NLP system may utilize an automatic speech recognition ("ASR") module to generate a transcript of a user utterance, and a natural language understanding ("NLU") module to generate a semantic representation of the user utterance. From the perspective of a user of such a system, the user experience can be defined in terms of the performance and latencies associated with obtaining a response to a user utterance or a confirmation of some action initiated by the user utterance. Many ASR modules wait until an utterance has been made in its entirety before generating ASR results. Processing by the NLU module is then necessarily delayed until after both (1) the utterance has been made in its entirety and (2) the ASR module has generated results. This can introduce a substantial amount of latency before the NLU module even begins determining user intent. NLU processing introduces additional latency before the NLU results may be used (e.g., by application software) to respond to a user request or to perform some other action.

Aspects of this disclosure relate to generating and utilizing incremental speech recognition and processing results to reduce latency and improve user-perceived system performance. In some embodiments, an ASR module may provide incremental results to an NLU module for processing. The incremental results may be generated based on a portion of a user utterance. For example, the first word or several words of a user utterance may be processed by the ASR module, and a transcript (or n-best list of likely transcripts) can be provided to the NLU module before the user has finished speaking. The NLU module can then generate an incremental semantic representation of the user's intent based on the incremental ASR results, and provide the incremental semantic representation (or data derived from the semantic representation) to an application. The application can perform proactive operations (e.g., operations that it would otherwise perform in response to final results from the NLU module). Performing operations proactively, before receipt of final NLU results and, in some cases, before the user has finished making the utterance, can reduce latency by ensuring that certain operations are in progress or have already been performed by the time the final NLU results are available.

Additional aspects of the disclosure relate to generating and utilizing additional incremental ASR and NLU results based on additional portions of the user utterance. In some embodiments, the ASR module may generate one or more incremental or cumulative results subsequent to generating the initial incremental results described above. For example, the ASR module may receive additional utterance audio data associated with the same utterance, and generate a second incremental ASR result or, in some cases, a final ASR result. The second ASR result may be either incremental (e.g., based only on a portion of utterance audio that followed the originally processed portion) or cumulative (based on the entire utterance received thus far, or a substantial portion thereof). In response to the receipt of these additional incremental ASR results, the NLU module may proceed to generate additional incremental NLU results. The NLU results may be the same as the previously generated incremental results (e.g., if the additional ASR results do not provide additional relevant information) or they may be different (e.g., if the additional ASR results provide additional information regarding the same intent previously determined by the NLU module, or if the additional ASR results result in an entirely different intent).

Further aspects of this disclosure relate to determining intent stability, over time, with respect to NLU results associated with a particular utterance. As described above and in greater detail below, an NLU module may generate multiple results from the same user utterance (e.g., the NLU result may be incrementally built from multiple incremental ASR transcripts of the utterance). If the NLU module determines that the user intent has remained the same over the course of multiple iterations of incremental ASR result processing, then the NLU module can determine that a particular level of intent stability has been reached. For example, if the determined intent is different from a previously determined intent that was based on previously received incremental ASR results, then the intent stability may be determined to be low. If the determined intent has remained the same, or substantially the same, in the NLU results generated from multiple incremental ASR results, then the intent stability may be determined to be high. Illustratively, once the intent stability reaches or exceeds some threshold, then an application may begin to perform operations based on the NLU results even if the NLU results are not final (e.g., even if the user has not finished speaking).

As used herein, the terms incremental, cumulative, preliminary, and partial may in some cases be used interchangeably when referring to ASR or NLU results that are not final results. Such results may be generally referred to as incremental results. In some cases, incremental results may become final results (e.g., as further ASR and/or NLU processing produces no changes to the results). In some non-limiting illustrative embodiments, incremental results refer to those results, generated by an ASR, NLU, or other speech or language processing module, that are based on less than the entire user utterance or that are based on incremental results from an upstream module or process.

Although aspects of the embodiments described in the disclosure will focus, for the purpose of illustration, on a natural language processing system that receives spoken input in the form of user utterances from a separate client device and determines a user intent from that input, one skilled in the art will appreciate that the techniques disclosed herein may be applied to any number of software processes or applications performing named entity recognition. For example, a single device or system may obtain user utterances, process the user utterances, and perform actions in response to the determined intent of the user utterances. Various aspects of the disclosure will now be described with regard to certain examples and embodiments, which are intended to illustrate but not limit the disclosure.

Figure 2:
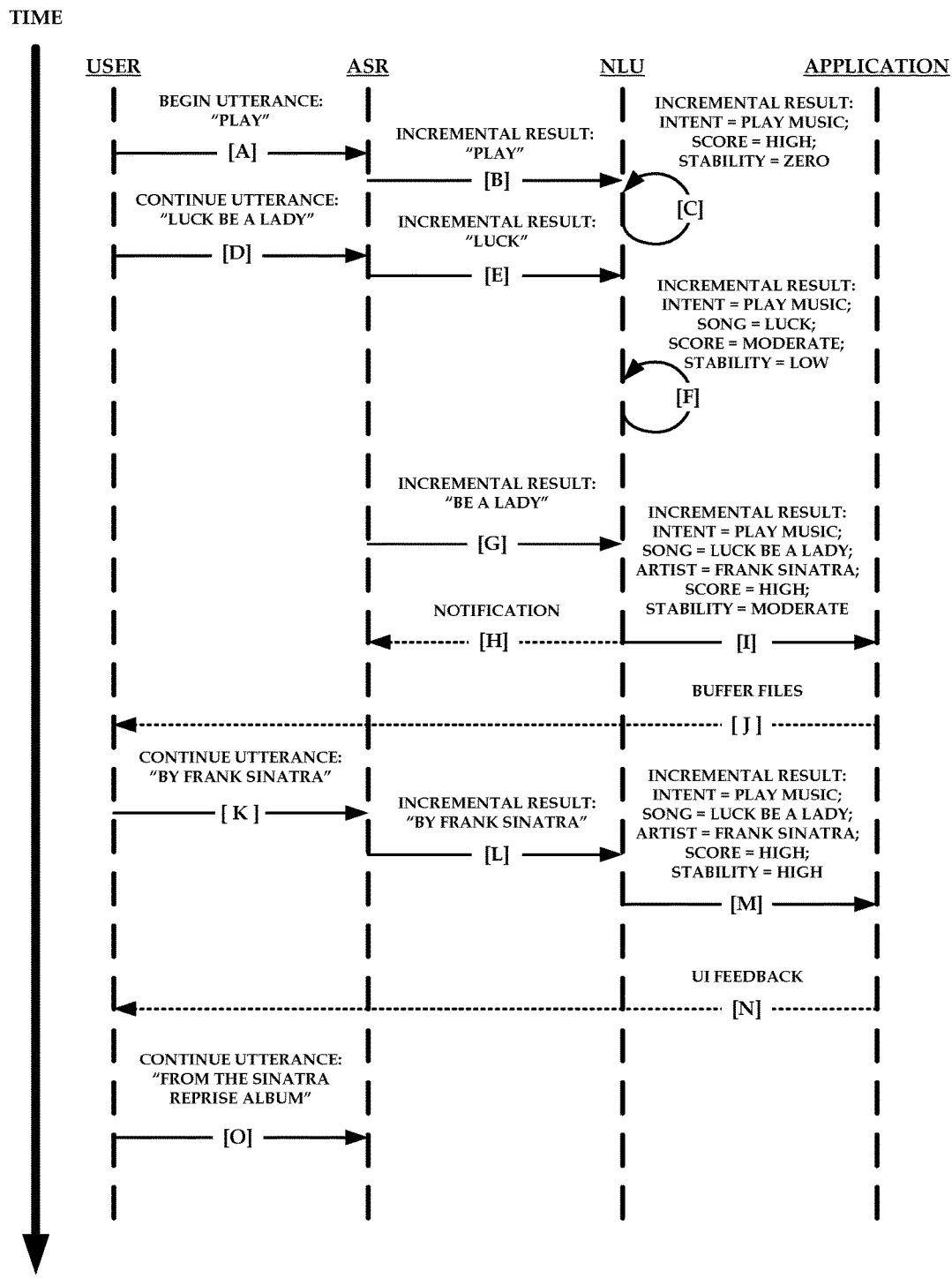
FIG. 2 shows illustrative interactions between a user and modules of a spoken language processing system when processing an example utterance.

With reference to an illustrative embodiment, FIGS. 1 and 2 show example interactions and data flows between various speech and language processing modules in response to receipt of a user utterance. FIG. 1 shows a user making an utterance at (A) that includes a spoken command for a computing system to perform some task. In one specific non-limiting example, as shown in FIG. 2, the user may say "Play 'Luck Be A Lady' by Frank Sinatra from the Sinatra Reprise Album." As shown in FIG. 1, the utterance may be provided to a spoken language processing system 100. The spoken language processing system 100 may include an ASR module 104, an NLU module 106, and an application module 108. An example spoken language system 100 is described in greater detail below with respect to FIG. 3.

Some conventional ASR modules determine the point in an audio stream at which a user begins speaking and the point at which the user finishes speaking, and then generate an ASR result for the audio in the interval between the points. The ASR result can then be processed by an NLU module to determine the semantic meaning (e.g., the user's intent). This technique can fail if the user pauses while speaking because the ASR module may generate a result based on utterance audio up to the user's pause, and that result may not include a complete command or intent because the user had not actually finished speaking the command. As a consequence, the NLU module may either fail or determine a wrong intent.

Advantageously, the ASR module 104 in FIG. 1 can process the utterance in segments or other portions, and provide one or more incremental transcripts to the NLU module 106 at (B). Instead of being configured to wait for a long pause prior to emitting a result, the ASR module 104 can be configured to generate results for portions of an utterance (e.g., generate a new incremental result after each short pause it encounters). Rather than generating a single result for the utterance, the ASR module may generate several shorter phrases. The NLU module 106 can be configured to accept each incremental result (e.g., multiple incremental additions to the sequence of words the user has spoken). In response to each incremental ASR result, the NLU module 106 can update its assessment of the intent, parameters or attributes associated with the intent (e.g., "slots"), etc. In addition, the NLU module 106 can assess how complete the command or intent is (e.g., through the use of scores and/or stability metrics). When the NLU module 106 has reached a stable intent, it can transmit the intent to an application 108. In some embodiments, the NLU module 106 can generate incremental results prior to determining a final result, and the application 108 can determine whether and how to act upon the incremental results.

As shown in FIG. 1, the NLU module 106 may include various sub-modules for processing ASR results or other text to generate a semantic representation of the input at (C). For example, the NLU module 106 may include a named entity recognizer 162, an intent classifier 164 and a named entity resolver 166. In some embodiments, the NLU module 106 may include additional, fewer, or alternative modules and components. Generally described, the components of the NLU module 106 assign labels to some or all of the words in the input (e.g., the transcript from the ASR module 104). Particular labeled words, also referred to as named entities, can then be analyzed to identify a user intent (e.g., the action that the user would like to initiate) and information associated with the intent. In the present example, the intent may be to play music, and named entities for the artist (Frank Sinatra), song (Luck Be A Lady) and album (Sinatra Reprise) may be identified. The NLU module 106 can determine an overall confidence score representing a probability that the results are valid or accurate. In some embodiments, the overall confidence score may be based on individual confidence scores generated by the individual sub-modules of the NLU module 106. The NLU module 106 may additionally or alternatively determine whether the identified user intent is stable. In some embodiments, the NLU module 106 may determine intent stability based on whether the interpretation of user intent has changed over time as the NLU module 106 processes additional incremental ASR results associated with the utterance. An example NLU process is described in greater detail below with respect to FIG. 5.

The NLU module 106 can provide incremental results to an application 108 at (E). In the present example, the NLU module 106 may provide incremental results to a music playback application because the identified user intent is to play music. At (F), the application 108 may perform proactive work based on the incremental results. For example, the application 108 may begin to buffer one or more music files, including "Luck Be A Lady" by Frank Sinatra, so that the song is ready for playback if subsequent NLU results confirm that the user does indeed wish to initiate playback of that particular song. In addition to such proactive work, or alternatively, the application 108 may provide feedback to the user at (G). For example, if the incremental NLU results indicate a high confidence score and stability for the identified intent, the application 108 can provide a notification to the user 102 that the application is ready to act on the intent (e.g., display a music playback interface indicating that "Luck Be A Lady" is ready for playback). Advantageously, such feedback may be provided to the user while the user is still speaking, or shortly thereafter, thereby reducing latency experienced by the user and improving user-perceived performance.

In some embodiments, the NLU module 106 may provide feedback to the ASR module 104, e.g., at (D). The feedback may include incremental NLU results that the ASR module 104 can use to improve speech recognition. For example, the ASR module 104 may change the ASR decoder network to affect how the future decoding (e.g., for the current utterance) gets weighted. As another example, the feedback may indicate whether and when intent stability has been identified by the NLU module 106. In some cases, intent stability may indicate the end of an utterance, or may be used by an ASR module 104 to help determine when the end of an utterance occurs.

FIG. 2 shows the flow of data between the system components of FIG. 1 in the present example, where the user has uttered "Play Luck Be A Lady by Frank Sinatra from the Sinatra Reprise Album." Some conventional ASR modules may wait until the user has made the entire utterance before generating ASR results (e.g., wait until a the passage of a substantial period of silence or background noise, such as ¼ second). In contrast, as shown in FIG. 2, the ASR module 104 may generate incremental ASR results before a user 102 has finished the utterance. For example, the ASR module 104 may partition the incoming audio into portions from which it can generate incremental results. In some embodiments, the ASR module 104 may partition the audio into single words or groups of words, predetermined or dynamically determined periods of time, etc.

For example, the user may begin the utterance by saying the word "Play" at [A]. As will be appreciated, the user may continue to make the remainder of the utterance in a natural fashion after saying the word "Play" at [A] (e.g., without a substantial, non-conversional, or otherwise artificial pause for the benefit of the system). The ASR module 104 may identify a likely word boundary in the incoming audio data. Illustratively, the ASR module 104 may identify a likely word boundary by detecting the acoustics associated with transitioning from the final phoneme of "Play" to the initial phoneme of "Luck", or by detecting silence, non-speech noise, or other background data for a threshold period of time (e.g., 1/30 second) that can indicate a brief period between words or phrases. The ASR module 104 can generate incremental ASR results based upon the portion of utterance data and provide the incremental results to the NLU module 106 at [B].

The NLU module 106 can process the incremental ASR results to generate incremental NLU results, scores, intent stabilities, and/or other information at [C]. The NLU module 106 may refrain from providing the incremental NLU results to an application 108 due to the score, intent stability, or a combination thereof. As shown in FIG. 2, the NLU module may generate the incremental NLU results as the user is continuing to make the utterance at [D]. The incremental results may include an incremental determination of the user intent and a score (e.g., a confidence score) associated with the user intent. In this case, the NLU module 106 has determined that the user wishes to play music, and has associated a high score with that intent. The high score may be based on a variety of factors, including but not limited to system capabilities (e.g., the system is primarily a music playback system), user history (this user plays music more often than videos or games), and the like. The NLU module 106 has also determined that the intent has a low stability. This may be due to the fact that this is the first result generated for the utterance, and therefore stability over time with respect to the same utterance has not yet be achieved.

Although FIG. 2 shows the generation of incremental NLU results at [C] occurring substantially concurrently with the continuing utterance at [D], the events may occur in a different order depending upon a variety of factors, including but not limited to available system resources, the speed at which a user speaks, specific system implementation, and the like. For example, in some cases the incremental NLU results based on the "Play" transcription may be generated before or during the time at which the user says "Luck Be A Lady," while in other cases the incremental NLU results may be generated at some time after the user says "Luck Be A Lady" or after the user completes the utterance altogether.

In the example shown in FIG. 2, the user may continue the utterance by saying "Luck Be A Lady" at [D]. The ASR module 104 may process the first word ("Luck") separately from the rest of the song title, depending upon the configuration of the ASR module 104 and/or other factors as described above. For example, the ASR module 104 may detect a likely word boundary between the words "Luck" and "Be," and therefore the ASR module 104 may partition the audio data at that point. Although FIG. 2 shows the ASR module 104 generating incremental results comprising only the word "Luck" at [E], the results need not be incremental. For example, in some embodiments the ASR module 104 may instead, or in addition, provide cumulative results (e.g., the entire recognized transcript thus far: "Play Luck" or "Play Luck Be A Lady").

The NLU module 106 may process this subsequent incremental result and begin to add information to the user intent at [F]. For example, some intents may be associated with one or more parameters, also referred to as slots. When the NLU module 106 processes input to generate a semantic representation of the input, it may attempt identify an intent and fill any slots associated with the intent. Illustratively, the "play music" intent may be associated with slots for "artist," "song name," "album," etc. Named entities, as processed by the NLU module 106, can correspond to particular slots. In the present example, the word "Luck" may labeled as a named entity of type "song name," and may be added to the incremental NLU results in the corresponding slot. The NLU module 106 may determine that it has a low confidence in the intent (e.g., due to lack of information for certain slots), and that the stability is also been low (e.g., because information associated with the intent has changed since the previously generated incremental result). The NLU module 106 may refrain from providing these incremental NLU results to the application 108 due again to the low intent stability.

The ASR module 104 may continue generating incremental results by processing the utterance audio corresponding to the words "Be A Lady." The ASR module 104 can provide these incremental results to the NLU module 106 at [G]. The NLU module 106 can process these incremental results and use them to add additional information to the intent (e.g., the "song name" slot may now be filled with "Luck Be A Lady.") In some embodiments, the NLU module 106 may infer or determine the values of some slots based on the values of other slots, user history, or the like. For example, if it is probable that the "artist" should be Frank Sinatra when the song name is "Luck Be A Lady," the NLU module 106 may include this information in the incremental results 106 even though it was not part of the input. In some embodiments, the NLU module 106 may have access to user-specific information (e.g., data indicating the current user often plays Frank Sinatra at the present time of day), and it may use that information to help determine that Frank Sinatra is the artist for the current song, to increase a score for Frank Sinatra, etc.

In some embodiments, certain portions of NLU processing may complete faster than other portions. For example, processing by the named entity recognizer 162 and intent classifier 164, described in greater detail below, may be completed quickly. In contrast, processing by the named entity resolver 166 may be completed more slowly relative to the named entity recognizer 162 and intent classifier 164. In the present example, the NLU module 106 may determine the intent to be "Play Music" and the likely song name to be "Luck Be a Lady." Subsequent processing by the named entity resolver 166 may indicate that Frank Sinatra is likely to be the artist, but this result may not be complete before the ASR module 104 has processed additional portions of the utterance and other components of the NLU module 106 have begun to process those incremental ASR results. When the named entity recognizer 162 and intent classifier 164 determine that Frank Sinatra is the artist based on additional incremental ASR results (e.g., as described below and illustrated at [L]), that may be confirmed by the completion of the previously initiated named entity resolver 166 processing.

In some embodiments, the NLU module 106 can provide a notification to the ASR module 104 regarding the status of the NLU processing, a determination that the NLU module 106 has reached a result with a confidence score and/or stability indicating that the results are final, etc. For example, as shown, the NLU module 106 may provide such a notification at [H]. In response to this notification, the ASR module 104 may determine that further processing of the utterance is not needed or that the utterance has finished because processing at the NLU module 106 is not producing, or is not likely to produce, a change to the NLU results. In some embodiments, the ASR module 104 may also indicate to the NLU module 106 that utterance processing is complete or is to be deemed complete.

The NLU module 106 can provide incremental results to the application 108 at [I]. For example, the NLU module 106 may determine that the score, intent stability, or a combination thereof has exceed some threshold and therefore the NLU results are to be provided to the application 108.

In some embodiments, the application 108 can decide whether or not to act on the incremental NLU results. The application 108 may consider various factors when making such a determination, including the score and/or stability information provided by the NLU module 106. For example, if the score is high and important slots associated with the user intent are filled, then the application may perform proactive operations at [J], such as buffering the most likely song file (or top-n most likely song files) so that they may be ready for playback more quickly than would otherwise be the case. As another example, the application 108 may consider the stability determination provided by the NLU module 106 before taking proactive action, such as by not performing certain operations (e.g., providing feedback to users) when intent stability is low or below some threshold.

As shown in FIG. 2, the user may continue the utterance at [K], saying "by Frank Sinatra." The ASR module 104 can process this portion of the utterance in whole or in part to generate incremental results, as described above. In this example, the ASR module 104 provides incremental results to the NLU module 106 at [L] including the words "by Frank Sinatra." The NLU module 106 can generate incremental results based upon the latest incremental ASR results. In this example, the NLU module 106 generates incremental results with the same intent and filled slots as the prior incremental results. The NLU module 106 may determine that the intent is now stable due to the same intent and slots being determined in response to two consecutive incremental ASR results. The NLU module 106 provides these results the application 108 at [M]. In some embodiments, the number of times that intents and associated data are to remain the same (or substantially the same) before intent stability is reached may be different (e.g., 3 or more consecutive results), determined dynamically, etc. Similar to the ASR module 104, the NLU module 106 need not provide cumulative results to the application 108, but instead may provide incremental results (e.g., only the information that has been added or changed in comparison to prior incremental results).

As shown, the application 108 may perform one or more operations at [N] in response to the latest incremental NLU results. In this example, the application 108 may determine, based on the high degree of intent stability, to provide feedback to the user indicating that the user's intent has been understood, that the requested operation is ready to be performed, or the like. Advantageously, this feedback can be provided to the user before the user finishes making the utterance, as shown by [O]. In some embodiments, the feedback may be provided after the user finishes making the utterance, or not at all.

The example operations by the application 108 shown in FIG. 2 and described above are illustrative only, and are not intended to be limiting. In some embodiments, an application 108 may perform different operations, make different decisions based on the score and/or stability information in the incremental NLU results, etc. For example, an application may not undertake proactive processing steps (e.g., buffering files) until a threshold level of stability has been achieved.

Spoken Language Processing System Environment

Figure 3:
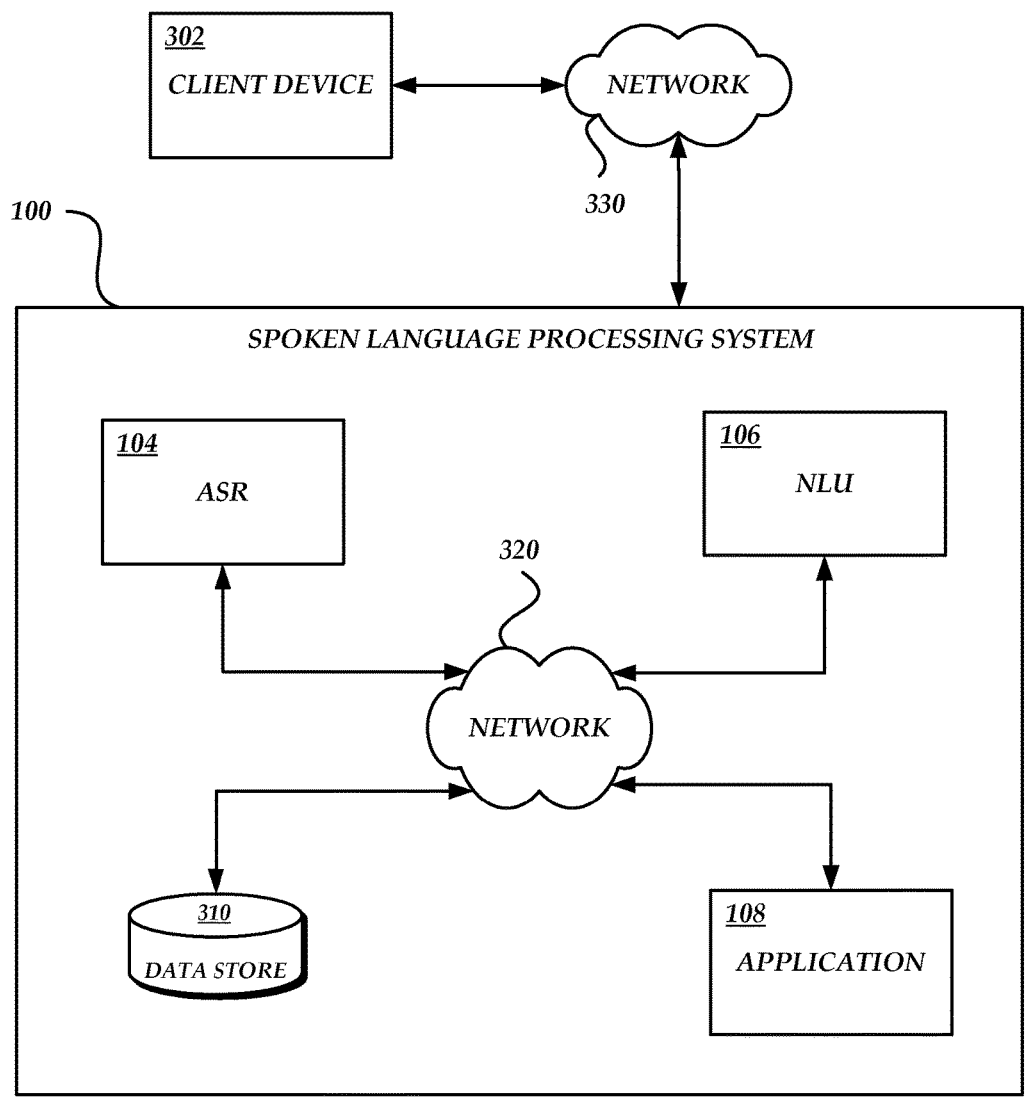
FIG. 3 is a block diagram of an illustrative computing environment including a client device and a remote spoken language processing system.

FIG. 3 illustrates an example spoken language processing system 100 and a client device 302. The spoken language processing system 100 can be a network-accessible system in communication with the client device 302 via a communication network 330, such as a cellular telephone network or the Internet. A user may use the client device 302 to submit utterances, receive information, and initiate various processes, either on the client device 302 or at the spoken language processing system 100. For example, the user can issue spoken commands to the client device 302 in order to get directions or listen to music, as described above.

The client device 302 can correspond to a wide variety of electronic devices. In some embodiments, the client device 302 may be a computing device that includes one or more processors and a memory which may contain software applications executed by the processors. The client device 302 may include a microphone or other audio input component for accepting speech input on which to perform speech recognition. The software of the client device 302 may include components for establishing communications over wireless communication networks or directly with other computing devices. Illustratively, the client device 302 may be a mobile device, such as a mobile phone, personal digital assistant ("PDA"), mobile gaming device, media player, electronic book reader, tablet computer, laptop computer, or the like. In some embodiments, the client device 302 may be a substantially stationary device, such as a television with program execution capabilities and network connectivity (a "smart TV"), set-top box, gaming console, home entertainment system, desktop computer, server computer, or the like.

The spoken language processing system 100 can be any computing system that is configured to communicate via a communication network. For example, the spoken language processing system 100 may include any number of server computing devices, desktop computing devices, mainframe computers, and the like. In some embodiments, the spoken language processing system 100 can include several devices physically or logically grouped together, such as an application server computing device configured to perform speech recognition on an utterance and a database server computing device configured to store records and speech recognition models.

The spoken language processing system 100 can include an ASR module 104, an NLU module 106, one or more applications 108, and one or more data stores 310. In some embodiments, the spoken language processing system 100 can include various modules and components combined on a single device, multiple instances of a single module or component, etc. For example, the spoken language processing system 100 may include a separate database server that may be configured with a data store 310; a server or group of servers configured with both ASR and NLU modules 104, 106; and a server or group of servers configured with applications 108. In multi-device implementations, the various devices of the spoken language processing system 100 may communicate via an internal communication network 320, such as a corporate or university network configured as a local area network ("LAN") or a wide area network ("WAN"). In some cases, the devices of the spoken language processing system 100 may communicate over an external network, such as the Internet, or a combination of internal and external networks.

In some embodiments, the features and services provided by the spoken language processing system 100 may be implemented as web services consumable via a communication network 330. In further embodiments, the spoken language processing system 100 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 330 may be a publicly accessible network of linked networks, possibly operated by various distinct parties, such as the Internet. In other embodiments, the network 330 may include a private network, personal area network ("PAN"), LAN, WAN, cable network, satellite network, etc. or some combination thereof, each with access to and/or from the Internet. For example, the devices of the spoken language processing system 100 may be located within a single data center, and may communicate via a private network as described above. The client device 302 may communicate with spoken language processing system 100 via the Internet. The client device 302 may have access to the Internet via a wired or WiFi connection, or via a cellular telephone network (e.g., a Long Term Evolution or LTE network).

Process for Generating Incremental ASR Results

Figure 4:
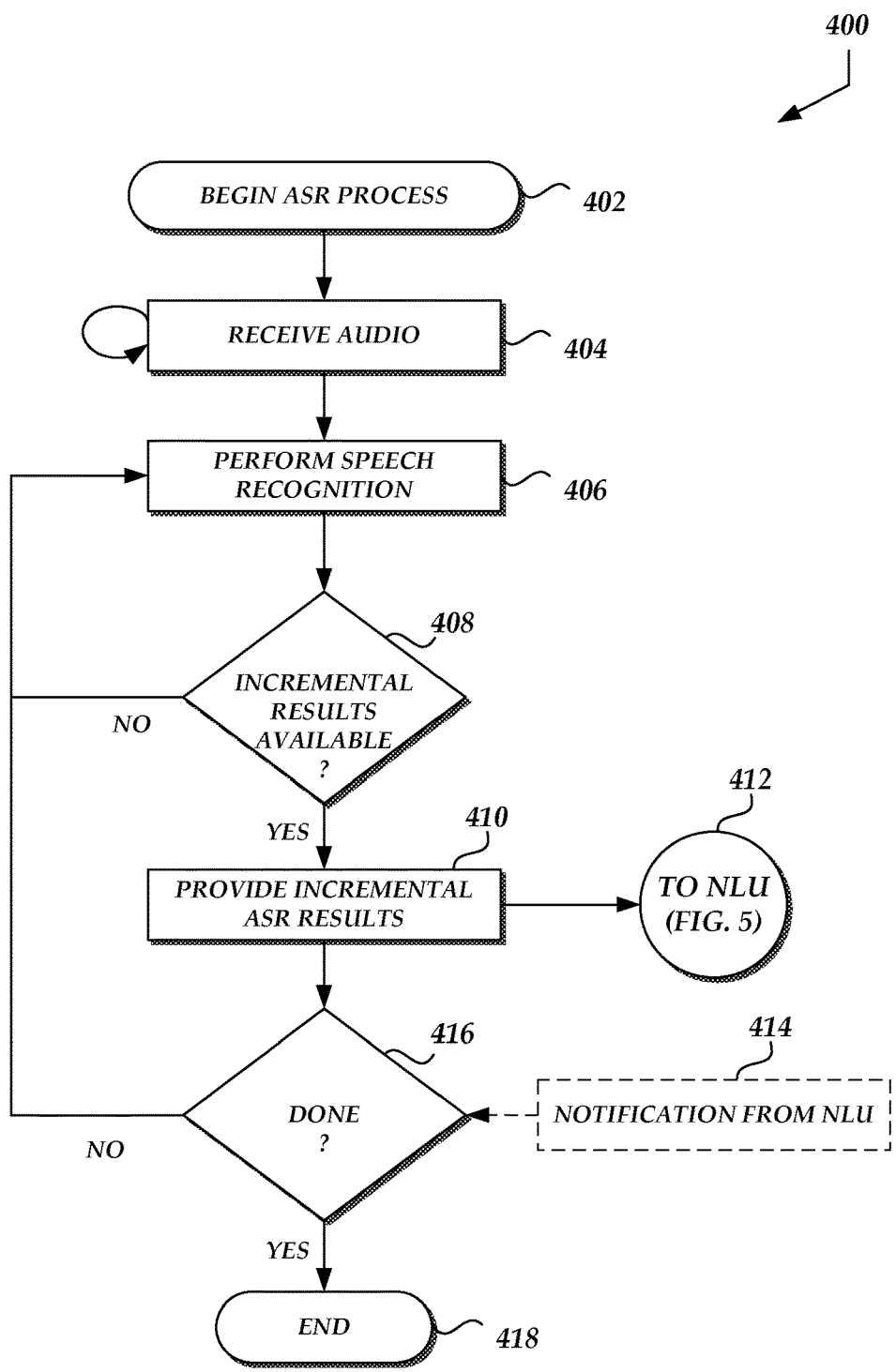
FIG. 4 is a flow diagram of an illustrative process for performing automatic speech recognition and generating incremental results.

With reference now to FIG. 4, a sample process 400 for processing a user utterance to generate incremental ASR results will be described. Advantageously, an ASR module 104 of a spoken language processing system 100 performing the process 400 can process a single utterance to generate one or more incremental ASR results. The incremental results may then be provided to other components of a spoken language processing system 100 for processing, typically before final ASR results would be available.

The process 400 begins at block 402. The process 400 may begin automatically upon initiation of a speech recognition session or receipt of input data. The process 400 may be embodied in a set of executable program instructions stored on a computer-readable medium, such as one or more disk drives, of a computing system of the spoken language processing system 100. When the process 400 is initiated, the executable program instructions can be loaded into memory, such as RAM, and executed by one or more processors of the computing system.

At block 404, the ASR module 104 or some other module or component of the spoken language processing system 100 can receive audio of an utterance from a client device 302. As described above, the user utterance may be a spoken command to play a recorded music file. The audio of the utterance, or portions thereof, may be received at block 404 and processed in a streaming fashion at subsequent blocks of the process 400. For example, the ASR module 104 may receive audio and proceed to block 406 for each of several segments or portions of the audio. The ASR module 104 may continue to receive portions of the audio after proceeding to block 406, and the process 400 may continue to proceed to block 406 for each of those portions.

At block 406, the ASR module 104 or some other module or component of the spoken language processing system 100 can perform speech recognition on the current portion of utterance audio. As will be appreciated by one of skill in the art, the ASR module 104 may utilize various models and sub-processes to generate a transcript (or n-best list of transcripts) for the portion of utterance audio.

At decision block 408, the ASR module 104 or some other module or component of the spoken language processing system 100 can determine whether incremental speech recognition results are available for a segment or portion. For example, the ASR module 104 may detect a likely word boundary in the utterance (e.g., by detecting the acoustics associated with transitioning from the final phoneme of one word to the initial phoneme of a subsequent word, or by detecting a threshold period of background sound). If so, incremental speech recognition results may be generated or otherwise made available for the portion preceding the word boundary (and subsequent to a prior word boundary, for portions after the initial portion of the utterance). The process 400 may then proceed to block 410. Otherwise, the process may return to block 406. In some embodiments, multiple words may be included in a given portion and in the incremental ASR results corresponding to the given portion (e.g., the ASR module may not produce discrete incremental results after each word boundary is detected). In some embodiments, the ASR module 104 may use other techniques to determine when to generate a result, such as generating results based on a predetermined or dynamically determined amount of utterance audio data.

At block 410, the ASR module 104 or some other module or component of the spoken language processing system 100 can provide incremental results to, e.g., the NLU module 106 for processing. The incremental results may include a transcript or n-best list of transcripts for the current portion, a cumulative transcript or n-best list of transcripts, part of a lattice, part of a consensus network, any other kind of ASR result known to those of skill in the art, etc.

At block 412, an NLU module 106 or some other module or component may receive the incremental ASR results and generate a semantic representation of the utterance or the portion of the utterance audio. For example, an NLU module 106 may use the process 500 described below with respect to FIG. 5, or some portion thereof, to generate a semantic representation based on incremental ASR results.

At block 414, a notification or some other feedback may be received from the NLU module 106 or some other module or component. In some embodiments, the notification may be based on a semantic representation of the utterance or utterance portion generated by an NLU module 106, a message indicating that the NLU module 106 has produced what it deems to be final results, a message indicating that the ASR module 104 may end processing of the current utterance, or some other feedback.

At decision block 416, the ASR module 104 or some other module or component of the spoken language processing system 100 can determine whether ASR processing of the utterance audio is done. The determination may be based on recent incremental ASR results, NLU feedback, a lack of additional audio data, other factors, or some combination thereof. If not, the process 400 may return to block 406. Otherwise, the process 400 may terminate at block 418.

Process for Generating Incremental NLU Results

Figure 5:
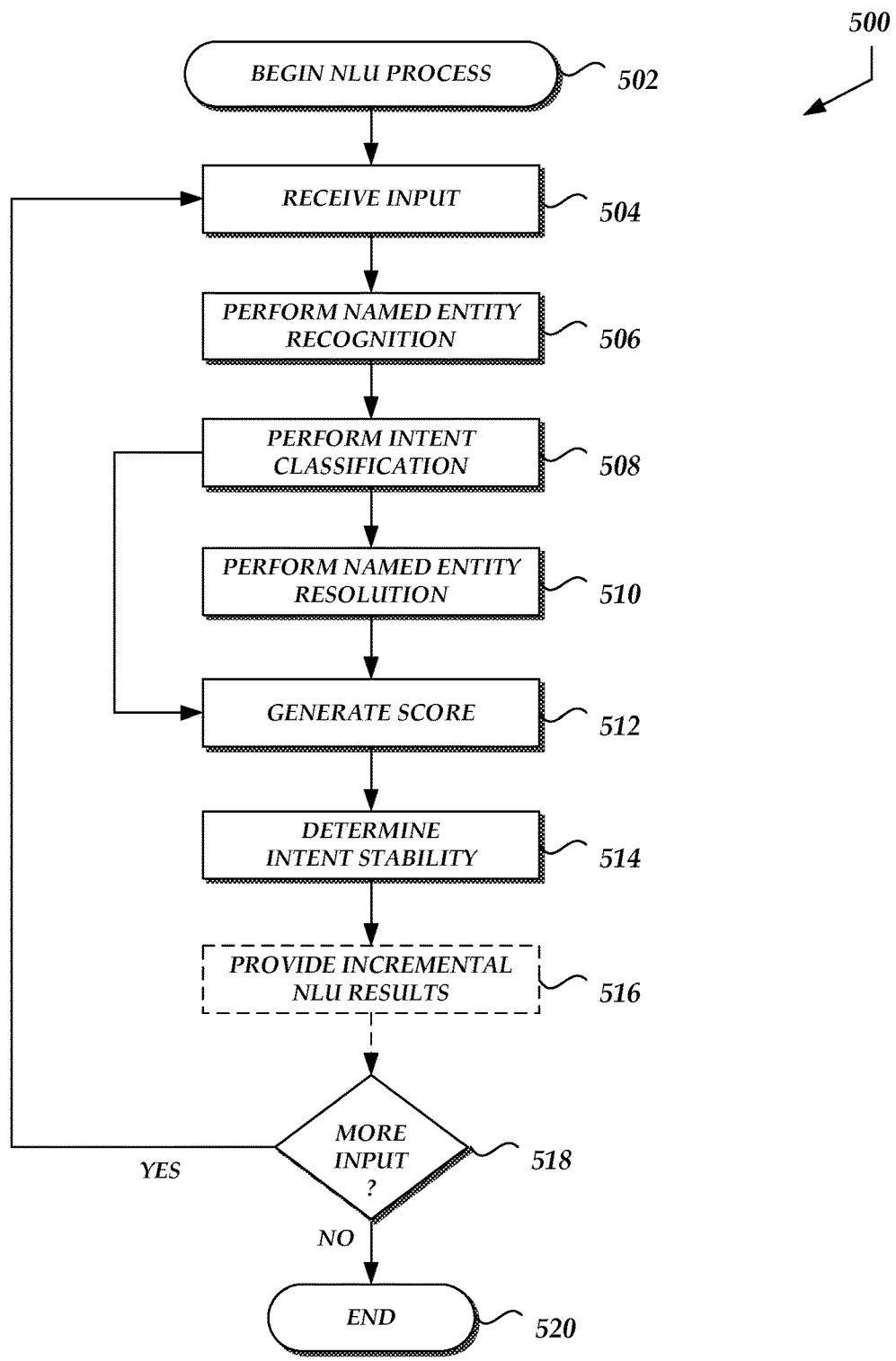
FIG. 5 is a flow diagram of an illustrative process for performing natural language processing and generating incremental results.

With reference now to FIG. 5, a sample process 500 for NLU processing of incremental ASR results will be described. Advantageously, an NLU module 106 of a spoken language processing system 100 performing the process 500 can generate incremental determinations of user intent for use by other modules or components, typically before final NLU results would otherwise be available. In addition, an NLU module 106 performing the process 500 can process multiple ASR results regarding a single utterance (e.g., ASR results generated by a conventional ASR module 104 from an utterance that includes one or more long pauses) and incrementally determine an actionable user intent.

The process 500 begins at block 502. The process 500 may begin automatically upon initiation of a speech recognition session or receipt of input data. The process 500 may be embodied in a set of executable program instructions stored on a computer-readable medium, such as one or more disk drives, of a computing system of the spoken language processing system 100. When the process 500 is initiated, the executable program instructions can be loaded into memory, such as RAM, and executed by one or more processors of the computing system.

At block 504, the NLU module 106 or some other module or component of the spoken language processing system 100 can receive input. Illustratively, the input may be an incremental ASR result including a partial transcription of a user utterance.

At block 506, the NLU module 106 can perform named entity recognition on the input data. A named entity recognizer 162 or some other module or component of the NLU module 106 can identify named entities or other terms of particular importance to the interpretation of the user utterance. For example, the named entity recognizer 162 may identify an action, an artist name, a song title, and/or other named entities relevant to music playback.

At block 508, the intent classifier 164 or some other component of the NLU module 106 can determine the likely user intent based on the named entities identified by the named entity recognizer 162. The process 500 may proceed to block 510.

At block 510, the named entity resolver 166 or some other component of the NLU module 106 can query a data store 310 and verify the accuracy of the named entity values. In some embodiments and circumstances, as described above, named entity resolution may be a time consuming procedure relative to other portions of NLU and/or ASR processing. The process 500 may therefore skip block 510 and proceed from block 508 directly to block 512, or the process 500 may include execution of block 510 concurrently with execution of blocks 512, etc.

One example of an NLU module that implements a named entity recognizer, intent classifier, and named entity resolver is described in U.S. patent application Ser. No. 13/786,237, filed on Mar. 5, 2013, which is incorporated by reference herein for all that it discloses.

At block 512, the NLU module 106 can generate a score for the intent determined above. Some or all of the sub-modules of the NLU module 106 may generate scores (e.g., confidence scores) during processing. The scores may represent the probability that the generated result is the correct result. For example, certain slots associated with an intent may be more important than others. The presence or lack of a named entity for these slots may directly affect the score generated by one or more of the sub-modules. The NLU module 106 may combine some or all of the scores into a final score, or otherwise generate a score based on the processing of the various NLU sub-modules.

At block 514, the NLU module 106 can determine the stability of the intent determined above. Generally described, stability is a measure of the level of certainty with which the NLU module 106 determined the intent based on ASR results. The NLU module 106 may compare the presently determined intent to the intents determined in response to prior ASR results in order to determine whether the intent or associated information has changed. For example, if the NLU module 106 receives new words from ASR (e.g., words not included in prior incremental ASR results for this utterance), yet these new words do not change the NLU result, then the stability measure can be increased because the new words have not altered the NLU result. In addition, the NLU module can use models of stable intents or other information about the importance of slots associated with the intent. Some slots may need to be filled with high confidence, while other slots may be less important. When the slots that require high confidence are filled, the NLU module 106 can be more certain about the generated result than would otherwise be the case (e.g., if only slots that need to be filled with low confidence are filled).

In some embodiments, the NLU module 106 can use information from various parts of the spoken language processing system 100 to help it determine the stability of the intent. For example, the NLU module 106 may use information from the ASR results (or otherwise obtained from the ASR module 104) regarding how much silence/background appears following the currently processed incremental ASR result. As another example, the NLU module 106 can use historical user-specific information, such as information regarding how long the current user typically pauses, how the current user typically structures a command and provides information for the intent slots, the kinds of requests the user has made recently, the kinds of request the user typically makes at the present time of day, etc.

At block 516, the NLU module 106 can provide incremental results to an application 108. In some embodiments, providing incremental NLU results may be optional, or may be determined dynamically. For example, the NLU module 106 may determine whether to provide NLU results based on scores, stability measures, other data, or some combination thereof. The NLU module 106 may generate a first result based on a first stability threshold so that an application 108 or other downstream components can perform proactive operations. Later, when a second stability threshold is reached, it can confirm the first result. As another example, if some later NLU result crosses the first threshold, the NLU module 106 can retract the first result. As a further example, if a particular period of time passes without reaching a second stability threshold, the NLU module 106 can retract previously transmitted results.

At decision block 518, the NLU module 106 can determine whether additional ASR results have been received. If so, the process 500 can return to block 506. Otherwise, the process 500 can terminate at block 520. In some embodiments, rather than determining whether additional input is available at decision block 518 and then returning to block 506, the NLU module 106 may perform processing of ASR results in parallel (e.g., there may be multiple instances of the process 500 executing in parallel for a particular utterance, or multiple instances of certain portions of the process 500 executing in parallel for a particular utterance).

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
a computer-readable memory storing executable instructions; and
one or more processors in communication with the computer-readable memory, wherein the one or more processors are programmed by the executable instructions to at least:
obtain, from a remote device, audio data regarding an utterance of a user, the utterance comprising a plurality of words;
determine a likely word boundary in the audio data;
generate first incremental speech recognition results from a first portion of the audio data, the first portion comprising only audio data preceding the likely word boundary;

generate a first semantic representation of the utterance using the first incremental speech recognition results and without using incremental speech recognition results representing any portion of the audio data following the likely word boundary;

generate a first stability score indicating a degree to which the first semantic representation of the utterance is the same as a previously-generated semantic representation of the utterance;

determine that the first stability score satisfies a first threshold;

in response to determining that the first stability score satisfies the first threshold:
  determine a plurality of content items associated with the first intent; and
  initiate loading of the plurality of content items;

generate second incremental speech recognition results from the first portion and a second portion of the audio data, the second portion comprising audio data preceding the likely word boundary and audio data subsequent to the likely word boundary;

generate a second semantic representation of the utterance using the second incremental speech recognition results;

generate a second stability score indicating a degree to which the first semantic representation of the utterance is the same as the second semantic representation of the utterance;

determine that the second stability score satisfies a second threshold; and in response to determining that the second stability score satisfies the second threshold:
  determine a requested content item of the plurality of content items based at least partly on the second semantic representation; and
  cause presentation of the requested content item by the remote device.

2. The system of claim 1, wherein the one or more processors are further programmed by the executable instructions to generate the second incremental speech recognition results concurrently with generating the first semantic representation.

3. A computer-implemented method comprising:
under control of one or more computing devices configured with specific computer-executable instructions,
  generating first speech recognition results using a first portion of a plurality of sequential portions of audio data, wherein the audio data represents a user utterance, and wherein the first speech recognition results are generated without using any sequential portion, of the plurality of sequential portions of audio data, following the first portion;
  generating a first semantic representation of the user utterance using the first speech recognition results and without using speech recognition results representing a second portion, of the plurality of sequential portions of audio data, following the first portion;
  determining a first score indicating a degree of confidence in the first semantic representation;
  determining that the first score satisfies a first threshold;
  in response to determining that the first score satisfies the first threshold:
    identifying a content item being requested by the user utterance; and
    loading a data file representing the content item;
  generating second speech recognition results using the first portion and the second portion of the plurality of sequential portions of audio data;
  generating a second semantic representation of the user utterance using the second speech recognition results;
  determining a second score indicating a degree to which the second semantic representation is the same as the first semantic representation;
  determining that the second score satisfies a second threshold; and
  in response to determining that the second score satisfies the second threshold, initiating presentation of the content item using the data file.

4. The computer-implemented method of claim 3, further comprising:
  providing, to a consumer of semantic representations, the second score and at least one of the first semantic representation or the second semantic representation.

5. The computer-implemented method of claim 3, wherein generating the second speech recognition results is performed substantially concurrently with generating the first semantic representation of the user utterance.

6. The computer-implemented method of claim 3, wherein the first portion of audio data comprises a portion prior to a first word boundary, and wherein the second portion of audio data comprises a portion subsequent to the first word boundary and prior to a second word boundary.

7. The computer-implemented method of claim 3, wherein generating the first semantic representation comprises determining a user intent.

8. The computer-implemented method of claim 7, wherein the user intent is associated with one or more attributes, and wherein generating the first semantic representation further comprises identifying information for at least one of the one or more attributes.

9. The computer-implemented method of claim 8, wherein determining the first score is based at least partly on information identified for an attribute.

10. The computer-implemented method of claim 3, wherein at least one of the first speech recognition results or the first semantic representation are based at least partly on a user-specific model.

11. The computer-implemented method of claim 3, further comprising providing feedback regarding generating the second semantic representation to an automatic speech recognition module.

12. The computer-implemented method of claim 3,
  wherein generating the first speech recognition results comprises generating first cumulative speech recognition results using the first portion and one or more preceding portions, of the plurality of sequential portions of audio data, that sequentially precede the first portion,
  wherein the first cumulative speech recognition results are generated without using any sequential portion, of the plurality of sequential portions of audio data, following the first portion, and
  wherein generating the second speech recognition results comprises generating second cumulative speech recognition results using first portion, the one or more preceding portions, and the second portion.

13. The computer-implemented method of claim 3, wherein loading the data file representing the content item comprises initiating loading the data file representing the content item before generating the second semantic representation.

14. The computer-implemented method of claim 3, wherein loading the data file representing the content item comprises initiating loading the data file representing the content item before the user utterance has ended.

15. The computer-implemented method of claim 3, further comprising transmitting a message regarding processing of the user utterance in response to determining that the first score satisfies the first threshold.

16. The computer-implemented method of claim 3, further comprising:
   determining a third score indicating a degree of confidence in the second semantic representation;
   determining that the third score satisfies the first threshold; and
   in response to determining that the third score satisfies the first threshold, canceling performance of a response operation initiated in response to determining that the first score satisfies the first threshold.

17. The computer-implemented method of claim 3, further comprising:
   determining that a threshold period of time has passed since the determining that the first score satisfies the first threshold; and
   in response to determining that the threshold period of time has passed, canceling performance of a response operation initiated in response to determining that the first score satisfies the first threshold.

18. The computer-implemented method of claim 3, further comprising loading a plurality of content items based at least partly on the first semantic representation, wherein the plurality of content items comprises the content item.

19. The computer-implemented method of claim 3, further comprising:
   sending, to an automatic speech recognition ("ASR") subsystem, feedback data regarding generating the first semantic representation; and
   modifying a decoder network of the ASR subsystem based at least partly on the feedback data, wherein generating the second speech recognition results comprises using the decoder network that has been modified.

20. The computer-implemented method of claim 3, wherein loading the data file is initiated prior to generating the second speech recognition results.

21. One or more non-transitory computer readable media comprising executable code that, when executed, cause one or more computing devices to perform a process comprising:
   generating first speech recognition results using a first portion of a plurality of sequential portions of audio data, wherein the audio data represents a user utterance, and wherein the first speech recognition results are generated without using any sequential portion, of the plurality of sequential portions of audio data, following the first portion;
   generating a first semantic representation of the user utterance using the first speech recognition results and without using speech recognition results representing a second portion, of the plurality of sequential portions of audio data, following the first portion;
   determining a first score indicating a degree of confidence in the first semantic representation;
   determining that the first score satisfies a first threshold;
   in response to determining that the first score satisfies the first threshold:
      identifying a content item being requested by the user utterance; and
      presenting a notification indicating the content item is ready for presentation;
   generating second speech recognition results using the first portion and the second portion of the plurality of sequential portions of audio data;
   generating a second semantic representation of the user utterance using the second speech recognition results;
   determining a second score indicating a degree to which the second semantic representation is the same as the first semantic representation;
   determining that the second score satisfies a second threshold; and
   in response to determining that the second score satisfies the second threshold, initiating presentation of the content item.

22. The one or more non-transitory computer readable media of claim 21, wherein generating the second speech recognition results is performed substantially concurrently with generating the first semantic representation of the user utterance.

23. The one or more non-transitory computer readable media of claim 21, wherein the first portion of audio data comprises a portion prior to a first word boundary, and wherein the second portion of audio data comprises a portion subsequent to the first word boundary and prior to a second word boundary.

24. The one or more non-transitory computer readable media of claim 21, wherein the second speech processing results include the first speech processing results.

25. The one or more non-transitory computer readable media of claim 21, wherein the second speech processing results do not include the first speech processing results.

26. The one or more non-transitory computer readable media of claim 21, wherein presenting the notification indicating the content item is ready for presentation comprises presenting a user interface of a content presentation application.

* * * * *